(12) United States Patent  
Horl et al.

(10) Patent No.: US 12,434,396 B2
(45) Date of Patent: Oct. 7, 2025

(54) CUTTING TOOL WITH SUPPORTING PORTION FOR PRE-SET GRINDING ANGLE

(71) Applicant: Horl 1993 GmbH, Freiburg (DE)

(72) Inventors: Otmar Horl, Freiburg (DE); Timo Horl, Freiburg (DE)

(73) Assignee: HORL 1993 GMBH (DE)

( * ) Notice: Subject to any disclaimer, the term of this patent is extended or adjusted under 35 U.S.C. 154(b) by 270 days.

(21) Appl. No.: 18/257,831

(22) PCT Filed: Dec. 9, 2021

(86) PCT No.: PCT/EP2021/084956
§ 371 (c)(1),
(2) Date: Jun. 15, 2023

(87) PCT Pub. No.: WO2022/128728
PCT Pub. Date: Jun. 23, 2022

(65) Prior Publication Data
US 2024/0051160 A1   Feb. 15, 2024

(30) Foreign Application Priority Data
Dec. 16, 2020  (DE) .................. 10 2020 133 853.8

(51) Int. Cl.
*B26B 3/00* (2006.01)
*B24B 3/54* (2006.01)
*B25G 1/10* (2006.01)

(52) U.S. Cl.
CPC ............... *B26B 3/00* (2013.01); *B24B 3/543* (2013.01); *B25G 1/10* (2013.01)

(58) Field of Classification Search
None
See application file for complete search history.

(56) References Cited

U.S. PATENT DOCUMENTS

| 4,070,742 A | 1/1978 | Dorfman |
| 5,461,785 A * | 10/1995 | Sol Na ............ B25F 1/00 30/340 |

(Continued)

FOREIGN PATENT DOCUMENTS

| AU | 2022268604 B2 * | 4/2025 | ............ B26B 13/20 |
| CA | 2053032 A1 | 4/1992 | |

(Continued)

OTHER PUBLICATIONS

English translation of WO-2021180687-A1, dated Sep. 16, 2021.*

(Continued)

*Primary Examiner* — Hwei-Siu C Payer
(74) *Attorney, Agent, or Firm* — Harness, Dickey & Pierce, P.L.C.

(57) ABSTRACT

A cutting tool, in particular a knife, includes at least one blade with a blade body and a cutting edge. In order to grind or polish the cutting tool with precision even without a grinding template, provision is made for the cutting tool to have at least one supporting portion which defines a supporting plane by means of which, for the purpose of grinding and/or polishing the cutting edge, the cutting tool can be stably placed on a planar underlying surface, the blade body therefore being oriented at a working angle ranging from 65° to 80° in relation to the underlying surface. A set for grinding and/or polishing a cutting tool and also a corresponding method are likewise disclosed.

10 Claims, 1 Drawing Sheet

(56) References Cited

U.S. PATENT DOCUMENTS

| | | | |
|---|---|---|---|
| 5,832,615 A * | 11/1998 | Costen | B25G 1/10 30/342 |
| 6,227,958 B1 * | 5/2001 | Neuberg | B24D 15/08 451/367 |
| 6,425,813 B1 | 7/2002 | Ernst | |
| 7,724,611 B2 | 5/2010 | Groothuis et al. | |
| 9,039,494 B1 * | 5/2015 | Dovel | B24D 15/08 76/82 |
| 2003/0166386 A1 | 9/2003 | McDonald | |
| 2007/0015445 A1 | 1/2007 | Harden | |
| 2014/0068951 A1 * | 3/2014 | Quimby | B25G 1/08 30/298.4 |
| 2020/0180172 A1 | 6/2020 | Godfrey | |
| 2024/0051160 A1 * | 2/2024 | Horl | B26B 3/00 |

FOREIGN PATENT DOCUMENTS

| | | |
|---|---|---|
| CN | 112405628 A | 2/2021 |
| DE | 202020001180 U1 | 4/2020 |
| DE | 202020103080 U1 | 7/2020 |
| EP | 3278928 A2 | 2/2018 |
| JP | S48046293 U | 6/1973 |
| JP | S62001861 U | 1/1987 |
| JP | H0538666 A | 2/1993 |
| JP | 2005066747 A | 3/2005 |
| JP | 2008260095 A | 10/2008 |
| JP | 2011143485 A | 7/2011 |
| WO | 2011123382 A1 | 10/2011 |
| WO | WO-2021180687 A1 * | 9/2021 ............. B24B 3/543 |

OTHER PUBLICATIONS

International Search Report for PCT/EP2021/084956, mailed on Mar. 31, 2022, 2 pages.
Japanese Office Action issued in corresponding Japanese application 2023-536370, dated Jul. 16, 2024; (4 pages).
Canadian Office Action in corresponding Canadian Patent Application No. 3203816 dated Nov. 26, 2024 (4 pages).
Japanese Notice of Allowance in corresponding Japanese Patent Application No. 2023-536370 issued Jan. 20, 2025 (7 pages).
German Office Action in corresponding German Patent Application No. 10 2020 133 853.8 issued Sep. 21, 2021 (8 pages).
Brazil Office Action in corresponding Brazil Patent Application No. 11-2023-010620.6 issued Jul. 13, 2025 (5 pages).
Korea Office Action in corresponding Korea Patent Application No. 10-2023-7022687 issued Jul. 18, 2025 (8 pages).

* cited by examiner

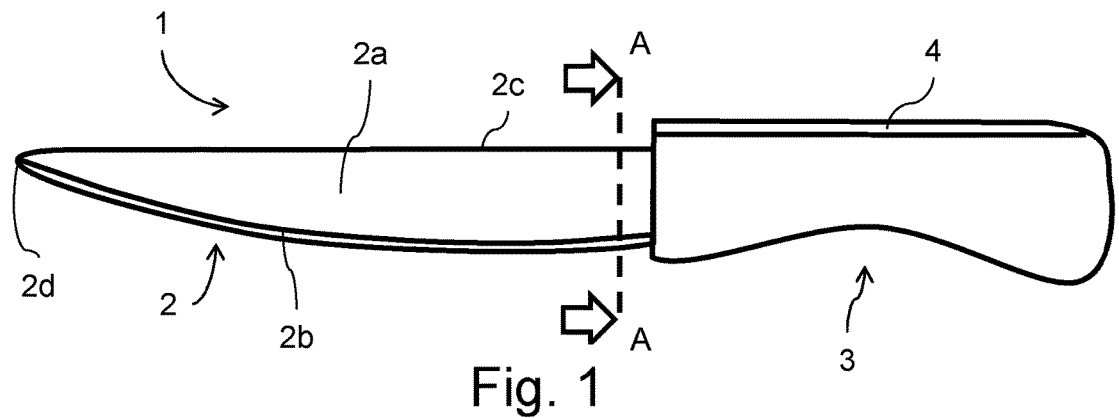
Fig. 1
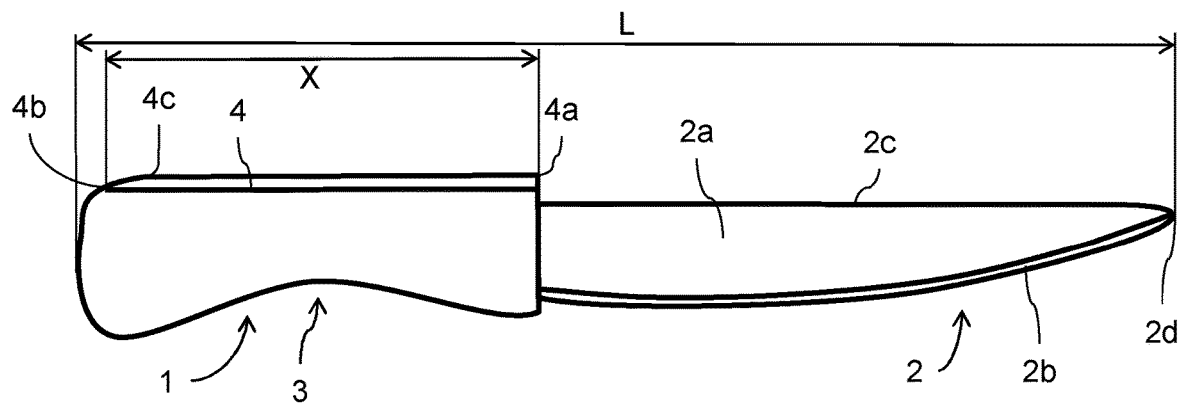
Fig. 2
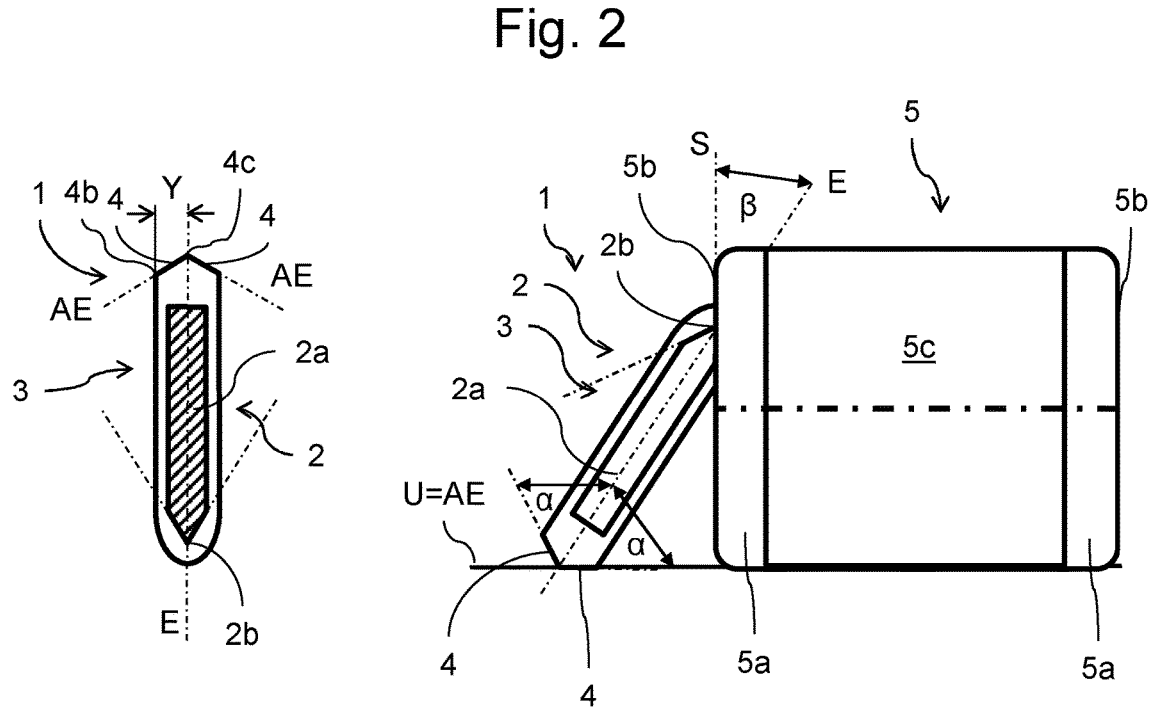
Fig. 3
Fig. 4

CUTTING TOOL WITH SUPPORTING PORTION FOR PRE-SET GRINDING ANGLE

CROSS-REFERENCE TO RELATED APPLICATIONS

The present application is a U.S. National Phase of International Application No. PCT/EP2021/084956, filed Dec. 9, 2021, which claims priority to German Application No. 10 2020 133 853.8, filed Dec. 16, 2020.

BACKGROUND

The present disclosure relates to a cutting tool, in particular a knife, such as a kitchen knife, comprising at least one blade with a blade body and a cutting edge.

For grinding or polishing the cutting edge, grinding or polishing tools with rotating grinding or polishing surfaces can be used. Such grinding or polishing tools, which are also referred to as "rolling grinders", are known, for example, from DE 20 2020 001 180 U1 or from EP 3 278 928 A.

For positioning the blade with respect to the grinding or polishing tool, a so-called grinding gauge can be used. With this grinding gauge, the blade is positioned at a predetermined grinding angle with respect to the grinding surface to grind the cutting edge at the grinding angle predetermined by the grinding gauge.

For a satisfactory working result, three components must be present and act together, which are the cutting tool, the grinding gauge and the grinding/polishing tool. This increases the logistic and coordinating effort for the user for the grinding and polishing working of the cutting tool.

The cutting tool is in particular a knife or kitchen knife, respectively, which comprises at least one blade with a blade body and a cutting edge, wherein the cutting tool includes at least one supporting portion defining a supporting plane by means of which the cutting tool can be stably placed on a planar underlying surface for grinding and/or polishing the cutting edge, so that the blade body (or its plane of extension) is oriented at a working angle ranging from 65° to 80° with respect to the underlying surface. The working angle designates the angle between the blade body (or its plane of extension) and the supporting plane. When the supporting plane rests on the underlying surface, the working angle designates the angle between the blade body (or its plane of extension) and the underlying surface. The grinding angle designates the angle between the plane of extension of the blade body and the grinding surface. With a rolling grinder mentioned in the beginning, the grinding surface rotates in a plane oriented perpendicular to the underlying surface. The grinding angle $\beta$ is consequently calculated from the working angle $\alpha$ by formula I:

$$\beta = 90° - \alpha. \qquad \text{Formula I:}$$

Within the scope of the present disclosure, "stable" means that the cutting tool rests on the underlying surface even during the grinding or polishing work while maintaining the working angle with respect to the supporting plane. In the process, the cutting tool is preferably held by a user at the handle and pressed onto the underlying surface with the supporting plane. It is desirable, though not necessary, that the cutting tool can automatically, that means without any external action of force, stably rest on the underlying surface with the supporting portion. Preferably, the center of gravity of the cutting tool with a projection onto the underlying surface is in the region of the supporting portion (between the points of support) when the cutting tool rests on the underlying surface with the supporting portion. In order to apply, during the grinding or polishing work, a counterforce to the force exerted on the blade by the grinding/polishing tool, it proves, however, advantageous for the cutting tool to be held by the user, during the grinding or polishing work, and to be pressed against the underlying surface with the supporting portion. During the grinding or polishing work, the cutting edge of the blade preferably faces away from the support, and the blade body's back faces the underlying surface (cf. FIG. 4). However, it is basically also possible for the supporting portion to be arranged at the cutting tool such that the cutting edge of the blade faces the underlying surface during the grinding or polishing work, and the blade body's back faces away from the underlying surface. In the manufacture of the cutting tool or optionally by adjusting the supporting portion before the grinding or polishing work begins, the working angle can be set within a range from 65° to 80°. During the grinding or polishing work, the working angle is preferably constant so that the cutting edge is sharpened uniformly and sharply.

It can be advantageous for the working angle to range from 70° to 75°. Grinding angles of 15° or 20°, respectively, prove to be particularly advantageous in practice. A grinding angle of 15° serves to grind a very sharp blade, for example of a filleting knife which is used for cutting meat. With a grinding angle of 20°, the cutting edge is less sharp, but is subject to less wear. Depending on the selection of the grinding angle ranging from 15° to 20°, corresponding to a working angle of 70° to 75°, the sharpness and the properties of wear of the cutting edge can be set.

It can prove to be useful for the cutting tool to include a handle body, the handle body preferably including at least one of the supporting portions, the supporting portion preferably being arranged on a side of the handle facing away from the cutting edge (e.g. at the handle's back). A contact force can be exerted on the handle body, in particular during the grinding or polishing work, to press the cutting tool, which rests with its supporting plane on the underlying surface in the working position, onto the underlying surface. Thereby, a static friction between the cutting tool and the underlying surface can be improved.

It can be useful for the supporting portion to include at least three points of support lying in the supporting plane which do not lie in one line, wherein preferably at least 25%, 30%, or 40% of the total length of the cutting tool, which is preferably measured between a blade's tip and an end of a handle body facing away from it, lie between two of these points of support, wherein preferably at least one of these points of support has a distance from a plane of extension of the blade body that is greater than 1%, 2%, or 3% of the total length of the cutting tool. For the stability of the arrangement, it is not the size of the supporting portion that is decisive, but rather the distances lying between the points of support in the supporting plane, in particular perpendicular to the plane of extension of the blade body. Even if the relative movement between the cutting edge and the grinding/polishing tool is usually performed in the plane of extension or parallel to it, in the grinding or polishing work, there are usually force components that act perpendicular to the plane of extension of the blade and displace the blade and the cutting tool from the intended working position. A large contact surface between the cutting tool and the underlying surface increases the static friction of the cutting tool to the underlying surface and stabilizes the cutting tool in the working position. It can be advantageous for the supporting portion to have an elastic design, in particular as a coating of silicone. Thereby, the static friction between the cutting tool and the underlying surface can be further improved.

It can be prove to make sense for the cutting tool to include two of such supporting portions which are arranged on different sides (of a plane of extension) of the blade body and each define one supporting plane by means of which the cutting tool can be stably placed on the underlying surface for grinding the cutting edge, so that the blade body (or its plane of extension) is oriented each time at the same working angle with respect to the underlying surface. Thereby, the cutting edge can be particularly uniformly sharpened and polished on both sides.

It can be practical for the supporting portion to be arranged at the cutting tool in an adjustable manner. Thereby, the cutting edge can be sharpened or polished at an individual grinding angle, depending on the application.

It can prove to be of assistance if the supporting portion is adjustable between at least two different positions to change the working angle, wherein preferably, the working angle in a first position of the supporting portion is 70°, and in a second position of the supporting portion is 75°. Thereby, the grinding angle is 20° in the first position, and 15° in the second position.

A further aspect relates to a set, comprising a cutting tool according to one of the previous designs, and a grinding and/or polishing tool with at least one grinding and/or polishing surface that rotates, during the rolling-off of the grinding and/or polishing tool, in a plane oriented perpendicular with respect to the underlying surface.

It can be advantageous for the grinding and/or polishing tool to include a cylindrical handle body, wherein such a grinding and/or polishing surface is arranged at each axial end of the handle body. These designs of a grinding/polishing tool prove to be very versatile and have proved their worth in practice.

A further aspect relates to a method for grinding and/or polishing a cutting tool according to one of the previous designs, the method comprising the following steps:

Step A: Arranging the cutting tool with the supporting plane on the planar underlying surface, so that the blade body is arranged at a working angle ranging from 65° to 80° with respect to the underlying surface. Preferably, the cutting tool is here pressed onto the underlying surface with the supporting portion by a user with expenditure of force, so that the cutting edge faces away from the underlying surface.

Step B: Placing the cutting edge against a grinding and/or polishing surface of a grinding and/or polishing tool that is oriented perpendicular to the underlying surface. A rolling grinder, as it is known, for example, from EP 3 278 928 A, has (a cylindrical body with two front) grinding or polishing surfaces which rotate in a plane oriented perpendicular to the underlying surface during the rolling-off of the rolling grinder on the planar underlying surface.

Step C: Grinding and/or polishing the cutting edge by performing a relative movement between the grinding and/or polishing surface and the cutting edge. Preferably, the cutting tool here remains stationary with respect to the underlying surface while the grinding/polishing tool moves along the cutting edge in the longitudinal direction thereof during the rolling-off on the underlying surface. By a light contact pressure between the cutting tool and the grinding/polishing tool, the grinding or polishing surface removes material from the blade during the relative movement and thus grinds or polishes the cutting edge.

Further advantageous developments of the disclosure result from combinations of the features disclosed in the description and the figures.

BRIEF DESCRIPTION OF THE FIGURES

FIG. 1 shows a schematic side view of a cutting tool according to an embodiment in the form of a kitchen knife with a blade, a handle body, and supporting portions arranged at the handle body which define a supporting plane for placing the cutting tool on a planar underlying surface.

FIG. 2 shows a schematic side view of the cutting tool of FIG. 1 from the other side.

FIG. 3 shows a sectional view in the cutting plane A-A of FIG. 1.

FIG. 4 shows a schematic front view of the cutting tool according to an embodiment with a view onto the blade body tip, wherein the cutting tool rests with one of the supporting surfaces on a planar underlying surface as intended, so that the blade body is oriented at a predetermined working angle with respect to the support, and wherein the cutting edge of the blade is worked with a grinding and/or polishing tool.

DETAILED DESCRIPTION OF THE PREFERRED EMBODIMENTS

One preferred embodiment will be described below in detail with reference to the enclosed figures.

FIG. 1 shows a side view of a cutting tool 1 which is designed as a kitchen knife. This kitchen knife 1 comprises a flat, oblong blade 2 with a blade body 2a, a bottom-side, convexly curved cutting edge 2b, an upper-side, straight blade back 2c, and a front-side tip 2d. The blade 2 extends in a plane (plane of extension E) and is connected with a handle 3 extending in the extension of the blade 2 and having an approximately cuboid or optionally cylindrical shape. At the bottom side, this handle 3 has a concave seat for the fingers of a user, as is represented in FIGS. 1 and 2. The handle 3 can be designed as a single-piece handle body. As an alternative, it is also possible for two handle half bowls, instead of one continuous handle body 3, to be arranged on different sides of the blade 2, or for the blade 2 to be sandwiched between the two handle half bowls.

At the upper side or at the back of the handle 3, there is a supporting portion 4 on each side of the blade 2 which is oriented at an angle α to the plane of extension E of the blade 2 and defines a supporting plane AE to be able to place the cutting tool 1 stably on a planar underlying surface U (e. g. kitchen countertop) for grinding or polishing the cutting edge 2b. These supporting portions 4 are arranged symmetrically to the plane of extension E of the blade body 2a on both sides of the cutting tool 1 so that the cutting edge 2b can be ground symmetrically to the plane of extension E of the blade body 2a at an identical grinding angle (3.

Each supporting portion 4 is formed as a continuous surface at the back of the handle 3 in the present exemplified embodiment. The two supporting portions 4 are joined at the back of the handle 3 in the plane of extension E of the blade body 2a and form a reflex angle of 360°−2*α. It is not necessary for each supporting portion 4 to form a continuous plane surface by itself. It is also possible that a plurality of discrete and spaced apart supporting portions 4 or points of support 4a, 4b, 4c together define the supporting plane AE. For example, at the front end (facing the tip 2d) and the rear end (facing away from the tip 2d) of the handle 3, two spaced apart projections can be formed as supporting portions 4 or points of support 4a, 4b, 4c to define the supporting plane AE. This variant would have the advantage that the handle 3 can be anatomically shaped in particular at the back of the handle for being used by the user as intended, while the user cannot haptically sense the supporting portions 4 when he or she is holding the handle 3. For the stability of the cutting tool 1 in the intended working position, it is of assistance if at least three different points of support 4a, 4b, 4c of each supporting portion 4 are spaced apart as far as possible, in particular in the longitudinal direction L of the cutting tool 1 and perpendicular to the plane of extension E of the blade body 2a, so that the blade body 2a can be held engaged at a constant working angle α to the grinding/polishing surface 5a during the intended grinding/polishing work. In the present example, the kitchen knife 1 has a total length L of about 30 cm. The two points of support 4a, 4b of the supporting portion 4 at the front and back ends of the handle 3 are here ideally spaced apart by a distance X that corresponds to at least 30% of the length L. The distance X between the points of support 4a and 4b, which is preferably measured along the total length of the cutting tool 1, is represented in FIG. 2 and accordingly amounts to at least 9 cm. Thereby, one can prevent, for example, that the blade's back 2c comes into contact with the underlying surface U during the intended grinding/polishing work of the cutting edge 2b. Ideally, the center of gravity of the cutting tool 1, when projected perpendicular to the supporting plane AE defined by the supporting portion 4, is exactly in the region of the supporting portion 4 or within the surface defined by the points of support 4a, 4b, 4c.

Furthermore, the point of support 4b, as represented in FIG. 3, has a distance Y from the plane of extension E of the blade body 2a that is at least 1%, that means 3 mm, from the total length (here 30 cm or 300 mm, respectively) of the cutting tool 1. The longer the distance Y of the extreme point of support 4b in the supporting plane AE from the plane of extension E of the blade body 2a is, the smaller is the tilted inclination of the cutting tool 1 in the working position. Thereby, it can be prevented that the working angle α unintentionally changes during the intended grinding/polishing work. Basically, a longer distance Y is desirable to increase the stability of the cutting tool 1 in the intended working position as represented in FIG. 4, however, the distance Y should not be so long that the handling of the cutting tool 1 during cutting is affected.

In the representation according to FIG. 3, the cutting tool 1 has a symmetrical cross-sectional profile.

In the present exemplified embodiment, the angle α between the supporting plane AE and the plane of extension E of the blade body 2a is 70°. When the cutting tool 1 rests on the planar underlying surface U with the plane of extension AE, this angle α corresponds to the so-called working angle α between the plane of extension E of the blade body 2a and the planar underlying surface U. Thereby, the blade body 2a is automatically positioned at an ideal grinding angle β of 20° with respect to the grinding surface 5b of a grinding/polishing tool 5 mentioned in the beginning. The grinding/polishing surface 5b of such a grinding/polishing tool 5 rotates, as is well-known, in a plane oriented perpendicular to the underlying surface U when the tool 5 is rolling off on the underlying surface U as intended.

For the intended application, the cutting tool 1 is initially placed or pressed onto the planar underlying surface U with the supporting plane AE, so that the blade body 2a is arranged at the predetermined working angle α α of 70° to the underlying surface U which corresponds to the angle between the supporting portion 4 and the plane of extension E of the blade body 2a (Step A). The user exerts the compression force preferably onto the handle 3, so that the force introduced into the handle 3 directly acts, via the supporting portion 4 arranged at the handle 3, onto the underlying surface U and stabilizes the cutting tool 1 in the working position.

Subsequently, the cutting edge 2b is placed against a grinding or polishing surface 5b of a grinding or polishing tool 5 oriented perpendicular to the underlying surface U (Step B) and then ground or polished by performing a relative movement between the grinding or polishing surface 5b and the cutting edge 2b in the longitudinal direction of the cutting edge 2b (Step C).

To grind the cutting edge 2b on both sides, the cutting tool 1 is placed onto the underlying surface U with the supporting plane AE defined by the other supporting portion 4. Then, the above-mentioned steps (A to C) are repeated.

In a non-depicted exemplified embodiment, which is substantially based on the previous exemplified embodiment and has identical features, with the exception of the differences mentioned below, the supporting portion 4 is adjustable to change the working angle α and can be optionally adjusted between a first position, in which the working angle is e. g. 70°, and a second position, in which the working angle is e. g. 75°. Ideally, the supporting portion 4 can be arrested both in the first and in the second position, so that an unintentional change of the working angle α is prevented.

Further advantageous developments of the disclosure are possible.

An advantage of the present disclosure substantially is that the cutting tool 1 can be positioned at a corresponding grinding angle β with respect to the grinding surface S without any further aids. In particular, a knife 1 whose handle 3 has the supporting portion 4 can be, tilted to the left and/or to the right, very easily and securely held at the corresponding grinding angle β without any further aids. The whole handle 3 could be sharpened flatly. However, the handle 3 could also be ground internally to thus have a support or points of support only at two edges. Even rounded, projecting rivets which represent a four-point support would be conceivable.

LIST OF REFERENCE SIGNS

1 Cutting tool (knife)
2 blade
2a blade body
2b cutting edge
2c blade back
2d blade tip
3 handle
4 supporting portion
5 grinding and/or polishing tool
5a grinding and/or polishing disk
5b grinding and/or polishing surface
5c handle body
AE supporting plane
E plane (of the blade body)
S grinding plane
U underlying surface

The invention claimed is:
1. A cutting tool, comprising:
  at least one blade, comprising:
    a blade body; and
    a cutting edge; and at least one supporting portion defining a supporting plane and configured to stably support the cutting tool on a planar underlying surface for grinding and/or polishing the cutting edge, so that the blade body is oriented at a working angle ranging from 65° to 80° with respect to the underlying surface.

2. The cutting tool according to claim 1, wherein the working angle ranges from 70° to 75°.

3. The cutting tool according to claim 1, further comprising a handle,
wherein the handle comprises the at least one supporting portion, and
wherein the at least one supporting portion is arranged on a side of the handle facing away from the cutting edge.

4. The cutting tool according to claim 1, wherein the at least one supporting portion comprises at least three points of support lying in the supporting plane which do not lie in one line.

5. The cutting tool according to claim 4, wherein at least 25% of the total length of the cutting tool is located between two of the at least three points of support.

6. The cutting tool according to claim 4, wherein at least one of the at least three points of support has a distance from a plane of extension of the blade body that is greater than 1% of the total length of the cutting tool.

7. The cutting tool according to claim 1, wherein the at least one supporting portion comprises two supporting portions, which are arranged on different sides of the blade body and each defines one supporting plane configured to stably support the cutting tool on the planar underlying surface for grinding or polishing the cutting edge, so that the blade body is oriented each time at the same working angle with respect to the underlying surface.

8. A set, comprising:
the cutting tool according to claim 1; and
a grinding and/or polishing tool comprising at least one grinding and/or polishing surface that rotates, during rolling of the grinding and/or polishing tool on the planar underlying surface, in a plane oriented perpendicular with respect to the underlying surface.

9. The set according to claim 8, wherein the grinding and/or polishing tool comprises a cylindrical handle body, and
wherein a grinding and/or polishing surface is arranged at each axial end of the handle body.

10. A method for grinding and/or polishing the cutting tool according to claim 1, comprising:
arranging the cutting tool with the supporting plane on the planar underlying surface, so that the blade body is arranged at the working angle ranging from 65° to 80° with respect to the underlying surface;
placing the cutting edge against a grinding and/or polishing surface of a grinding and/or polishing tool that is oriented perpendicular to the underlying surface; and
grinding and/or polishing the cutting edge by performing a relative movement between the grinding and/or polishing surface and the cutting edge in the longitudinal direction of the cutting edge.

* * * * *